US007020734B2

(12) United States Patent
Mimatsu et al.

(10) Patent No.: US 7,020,734 B2
(45) Date of Patent: Mar. 28, 2006

(54) CONNECTING DEVICE OF STORAGE DEVICE AND COMPUTER SYSTEM INCLUDING THE SAME CONNECTING DEVICE

(75) Inventors: Yasuyuki Mimatsu, Yokohama (JP); Yasutomo Yamamoto, Sagamihara (JP); Kenji Muraoka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 422 days.

(21) Appl. No.: 10/372,913

(22) Filed: Feb. 26, 2003

(65) Prior Publication Data

US 2004/0111485 A1 Jun. 10, 2004

(30) Foreign Application Priority Data

Dec. 9, 2002 (JP) ............................. 2002-356477

(51) Int. Cl.
*G06F 13/36* (2006.01)
*H04L 12/28* (2006.01)

(52) U.S. Cl. ...................... 710/311; 710/312; 710/313; 710/314; 710/315; 370/351

(58) Field of Classification Search ........ 710/311–315; 370/351, 363, 368
See application file for complete search history.

(56) References Cited

U.S. PATENT DOCUMENTS

| 5,845,295 | A | 12/1998 | Houseman et al. |
| 5,867,736 | A | 2/1999 | Jantz |
| 6,430,645 | B1 * | 8/2002 | Basham ...................... 710/305 |
| 6,553,408 | B1 | 4/2003 | Merrell et al. |
| 6,625,691 | B1 | 9/2003 | Obara et al. |
| 6,683,883 | B1 * | 1/2004 | Czeiger et al. ............. 370/401 |
| 6,889,309 | B1 | 5/2005 | Oliveira et al. |
| 2002/0095549 | A1 | 7/2002 | Matsunami et al. |
| 2003/0093439 | A1 | 5/2003 | Mogi et al. |
| 2003/0126327 | A1 | 7/2003 | Pesola et al. |
| 2005/0036499 | A1 * | 2/2005 | Dutt et al. ................... 370/401 |

OTHER PUBLICATIONS

Hitachi Freedom Storage Lightning 9900 Series, Thunder 9200 and 7700E Guidelines for Oracle Database Backup and Recovery, October 2001 Issued by Hitachi, Ltd., Hitachi Data Systems and Oracle Corporation.

* cited by examiner

Primary Examiner—Tim Vo
(74) Attorney, Agent, or Firm—Mattingly, Stanger, Malur & Brundidge, P.C.

(57) ABSTRACT

In an environment in which plural external storage devices having different function control interfaces are intermixed, when a function of a storage device is controlled from a computer, a common interface for controlling the function of the storage device is provided. A device that provides the common interface manages an interrelationship between a storage area recognized by a host computer and a storage area provided by the storage device and associates a storage area which becomes a target of a function control instruction with the storage device that provides the storage area. A type of the storage device that provides the storage area which becomes the target of the function control instruction is identified and function control is ordered through a function control interface unique to the device.

17 Claims, 15 Drawing Sheets

COMMON INTERFACE MANAGEMENT TABLE
(ADDITIONAL)

| PORT ID | PORT NUMBER |
|---------|-------------|
| IP Addr.1 | Port num.1 |
| IP Addr.2 | Port num.2 |
|  |  |

OVERALL CONFIGURATION

FIG. 2

VIRTUAL VOLUME MANAGEMENT TABLE

| VIRTUAL VOLUME | PORT ID | LUN | Vol. 1 | Vol. 2 | Vol. 3 | ... | Vol. n | CONTROL PROCESSING ITEM |
|---|---|---|---|---|---|---|---|---|
| 1 | wwn1 | lun1 | 1 | 3 | – | | – | BEING PROCESSED |
| 2 | wwn2 | lun2 | 2 | 4 | – | | – | – |

DISK VOLUME MANAGEMENT TABLE

| Vol. | PORT ID | LUN | CAPACITY | DEVICE TYPE | DEVICE IDENTIFIER | MIRROR INITIALIZATION | | MIRROR SUSPENSION | | ... | SNAPSHOT ACQUISITION | |
|---|---|---|---|---|---|---|---|---|---|---|---|---|
| | | | | | | API | I/F | API | I/F | | API | I/F |
| 1 | wwn3 | lun0 | 10GB | xxx | A | func1 | IP Addr, Port WWN, LUN | func2 | IP Addr, Port WWN, LUN | ... | func4 | IP Addr, Port WWN, LUN |
| 2 | wwn4 | lun0 | 20GB | yyy | B | func5 | | func6 | | ... | func8 | |

3101 3102 3103 3104 3105 3106 3107 3108 3109 3110 3111 3112

INTERFACE CORRESPONDENCE TABLE

| DEVICE TYPE | MIRROR INITIALIZATION | MIRROR SUSPENSION | MIRROR RE-SYNCHRONIZATION | ... | SNAPSHOT ACQUISITION |
|---|---|---|---|---|---|
| xxx | func1 | func2 | func3 | | func4 |
| yyy | func5 | func6 | func7 | | func8 |
| | | | | | |

4101, 4102, 4103, 4104, 4105

CONTROL BLOCK

| BYTE 1 | COMMAND | 5101 |
| BYTE 2 | PARAMETER 1 | 5102 |
| BYTE 3 | PARAMETER 2 | 5103 |
| BYTE n | PARAMETER n | 5104 |

FLOW OF MIRROR PAIR INITIALIZATION

CONTROL BLOCK

ARGUMENT DATA STRUCTURE OF CONTROL API

FIG. 11

STATE CORRESPONDENCE TABLE OF DISK VOLUME AND VIRTUAL VOLUME

| MIRROR PAIR STATE OF DISK VOLUME | MIRROR PAIR STATE OF VIRTUAL VOLUME |
|---|---|
| ALL MIRROR PAIR STATES ARE IDENTICAL | IDENTICAL WITH MIRROR PAIR STATE OF DISK VOLUME |
| ALL MIRROR PAIR STATES ARE EITHER INITIALIZATION OR SYNCHRONIZATION | INITIALIZATION |
| ALL MIRROR PAIR STATES ARE EITHER RE-SYNCHRONIZATION OR SYNCHRONIZATION | RE-SYNCHRONIZATION |
| EXCEPT AFORESAID ITEMS | ERROR |

FIG. 12

COMMON INTERFACE MANAGEMENT TABLE

| PORT ID | LUN |
|---------|------|
| wwn5 | lun0 |
| wwn6 | lun7 |
| | |

FIG. 13

COMMON INTERFACE MANAGEMENT TABLE
(ADDITIONAL)

| PORT ID | PORT NUMBER |
|---------|-------------|
| IP Addr.1 | Port num.1 |
| IP Addr.2 | Port num.2 |
| | |

FIG. 14

DISK VOLUME MANAGEMENT TABLE

| Vol. | DEVICE IDENTIFIER | MIRROR INITIALIZATION | | | ... | SNAPSHOT ACQUISITION | | |
| --- | --- | --- | --- | --- | --- | --- | --- | --- |
| | | API | I/F | Recovery API | | API | I/F | Recovery API |
| 1 | A | func1 | IP Addr, Port | func10 | ... | func4 | IP Addr, Port | func11 |
| | | func5 | WWN2, LUN0 | func12 | ... | func8 | WWN2, LUN0 | func13 |
| 2 | B | func5 | WWN1, LUN0 | func14 | ... | func8 | WWN1, LUN0 | func15 |
| ... | ... | — | — | — | ... | — | — | — |

FLOW OF MIRROR PAIR INITIALIZATION

OVERALL CONFIGURATION

FIG. 17

COMMON INTERFACE CONTROL BLOCK

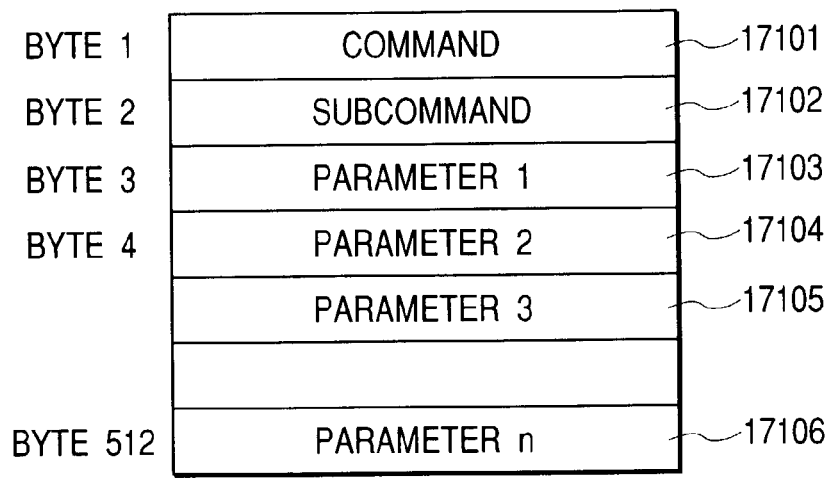

| | | |
|---|---|---|
| BYTE 1 | COMMAND | 17101 |
| BYTE 2 | SUBCOMMAND | 17102 |
| BYTE 3 | PARAMETER 1 | 17103 |
| BYTE 4 | PARAMETER 2 | 17104 |
| | PARAMETER 3 | 17105 |
| BYTE 512 | PARAMETER n | 17106 |

FIG. 18

CONTROL AUTHORITY MANAGEMENT TABLE

| Vol. | FUNCTION CONTROL | CONTROL PERMISSION |
|---|---|---|
| 1 | MIRROR INITIALIZATION | wwn1, wwn2 |
| | MIRROR SUSPENSION | wwn1, wwn2 |
| | ⋮ | |
| | SNAPSHOT ACQUISITION | wwn2 |
| 2 | MIRROR INITIALIZATION | wwn3, wwn4 |
| | MIRROR SUSPENSION | wwn3, wwn4 |
| | ⋮ | |
| | SNAPSHOT ACQUISITION | — |
| ⋮ | ⋮ | ⋮ |

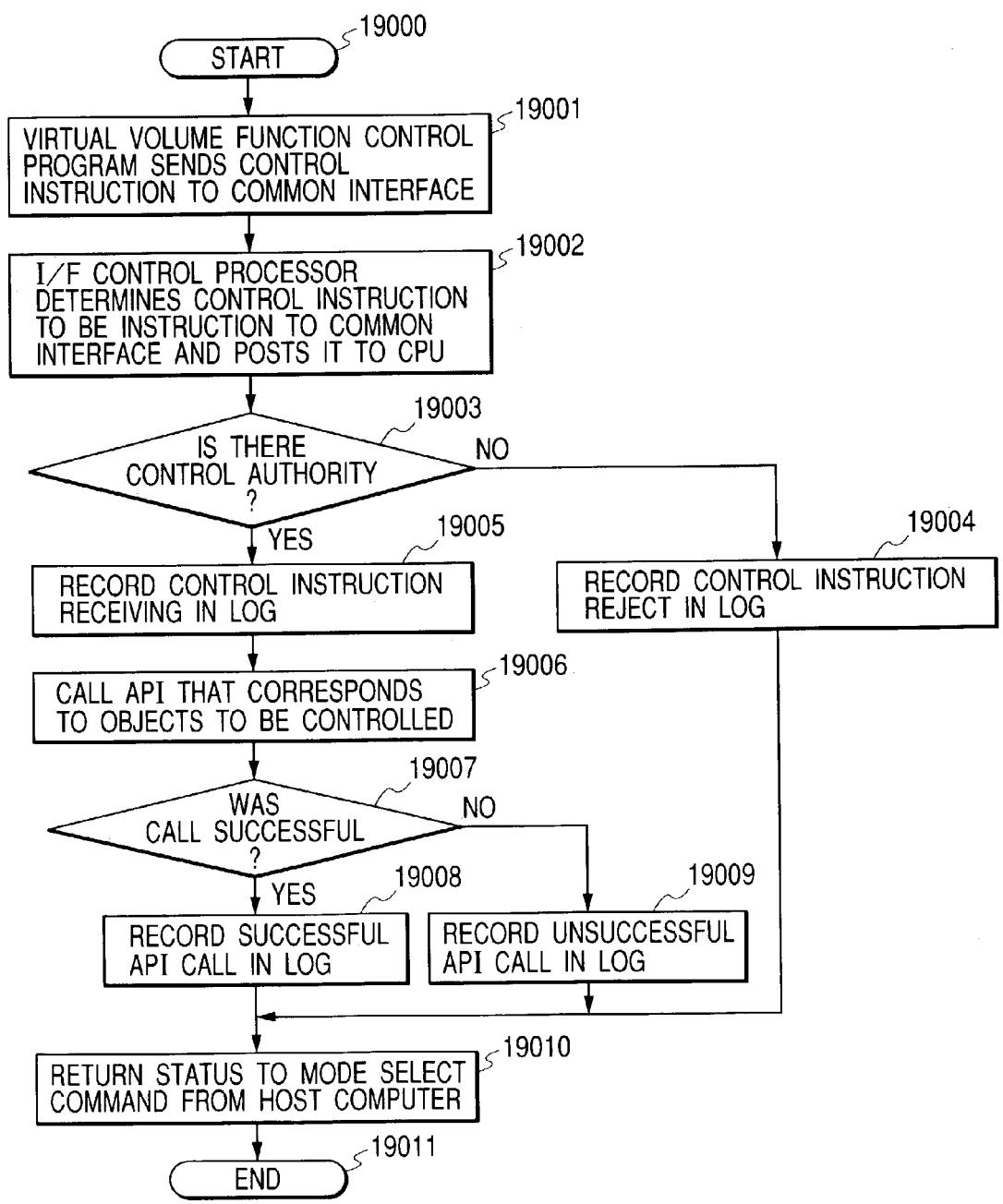

CONNECTING DEVICE OF STORAGE DEVICE AND COMPUTER SYSTEM INCLUDING THE SAME CONNECTING DEVICE

BACKGROUND OF THE INVENTION

The present invention relates to an art that connects a host computer and plural storage devices, and more particularly, to the control of various functions with which a storage device such a disk array provides the user.

In recent years, the intelligent formation of a computer storage device that is typically represented by a disk array is advancing. For example, a mirror function which a disk array device provides, when a host computer updates data of a storage area in the disk array device, automatically writes the update data even to another predetermined storage area. The storage data at that time is saved by instructing the disk array device to suspend the mirror function and can be used for an application such as backup. Because the writing of update data to another area is executed by a controller in the disk array device, a load is not imposed upon the host computer and high-speed input/output processing is enabled (for example, refer to U.S. Pat. No. 5,845,295).

On the other hand, the number of storage devices in a system increases and the storage devices of different types are intermixed. That is, the storage devices having different protocols are intermixed. At this point, "function" means capabilities to perform mirroring, take a snapshot, and so on provided by storage device, and "function control" means that control is performed so that a host computer can make the storage device implement these functions.

The host computer controls a function by accessing a function control interface which a disk array provides and sending an instruction according to a protocol unique to a predefined storage device. The function control interface can be realized in various forms such as an in-band SCSI command and TCP/IP communication via a LAN (for example, refer to U.S. Pat. No. 5,867,736).

Moreover, the spread of a storage area network (SAN) that connects plural host computers with plural storage devices through a network is advancing. The SAN is a high-speed network dedicated to data input/output that is typically a Fibre Channel and can improve the input/output performance of a computer. Further, the various utilization of storage areas is enabled, that is a computer group connected through the SAN can share one storage device, and, conversely, one computer can access plural storage devices. Recently, it has begun to introduce the art of storage virtualization that not only achieves sharing of a storage device/storage area but concatenates or partitions a storage area (disk volume) which a storage device provides and provides a host computer with a virtual storage area (virtual volume) to realize the flexible management of storage area.

In a computer system in which plural storage devices of different types are intermixed, such as SAN environment, when an intelligent function a storage device provides is utilized, a host computer must identify the type of a disk array to be controlled and send a function control instruction through an interface unique to each storage device. The control is complicated because even in the case to control similar functions, different control programs must be prepared for all different devices and used properly in the host computer.

Moreover, it is considered in the storage virtualization that intelligent functions work on virtual volumes are realized utilizing functions provided by storage devices. In this case, if a virtual volume has plural disk volumes, the function control must be instructed per disk volume. Accordingly, because a host computer must identify a device that provides the actual storage area of the virtual volume and use a control interface unique to each device, the control is complicated.

SUMMARY OF THE INVENTION

The present invention, in order to control various functions of a storage device of a different type, has been made in view of the above circumstances, and provides a common control interface that does not depend on the type of the device and implements the simplification of control.

The present invention installs a common interface for controlling the function of a storage device in a virtualization server and a switch of a computer system and provides a function control method that does not depend on the type of the storage device. A host computer sends a function control instruction to the common interface according to a predefined protocol regardless of the type of the storage device to be controlled. The device that provides the common interface manages the interrelationship between a storage area recognized by the host computer and a storage area provided by the storage device. Further, the device is provided with a means for converting the protocol of the common interface to a protocol unique to each device and a means for implementing the function control through an interface unique to each storage device.

When the device that provides the common interface receives a function control instruction, storage areas to which a function is applied and a storage device that provides the storage areas are interpreted. For example, if the instruction specifies a virtual volume, disk volumes that compose the virtual volume are interpreted. The type of the storage device that provides the storage area to be instructed is identified and function control is instructed through the function control interface unique to the device. The interface unique to each device is concealed by an interface server and the host computer can control a function using the common interface without being sensitive to the type of the device to be controlled. Because the host computer does not need to adapt to plural different interfaces and use each interface properly, the simplification of control can be achieved.

BRIEF DESCRIPTION OF THE DRAWINGS

FIG. 2 is a drawing showing the configuration of a virtual volume management table in the first embodiment of the present invention;

FIG. 3 is a drawing showing the configuration of a disk volume management table in the first embodiment of the present invention;

FIG. 11 is a state correspondence table of a disk volume and a virtual volume in the first embodiment of the present invention;

FIG. 12 is a drawing showing the configuration of a common interface management table in the first embodiment of the present invention;

FIG. 13 is a drawing showing the configuration of the additional part of the common interface management table in a second embodiment of the present invention;

FIG. 14 is a drawing showing the configuration of the disk volume management table in the second embodiment of the present invention;

FIG. 17 is a drawing showing the configuration of the control block of the common interface in the third embodiment of the present invention;

FIG. 18 is a drawing showing the configuration of a control authority management table in the third embodiment of the present invention; and FIG. 19 is a flowchart of a function control instruction of the disk volume in the third embodiment of the present invention.

DETAILED DESCRIPTION OF PREFERRED EMBODIMENTS

First Embodiment

This embodiment, in storage virtualization environment in which a virtualization server virtualizes storage areas provided by two disk array devices connected through a Fibre Channel and having different function control interfaces, is an example of controlling a mirror function of a virtual volume realized using mirror functions provided by the disk array devices, utilizing a common interface which the virtualization server provides.

(1) System Configuration

Figure 1:
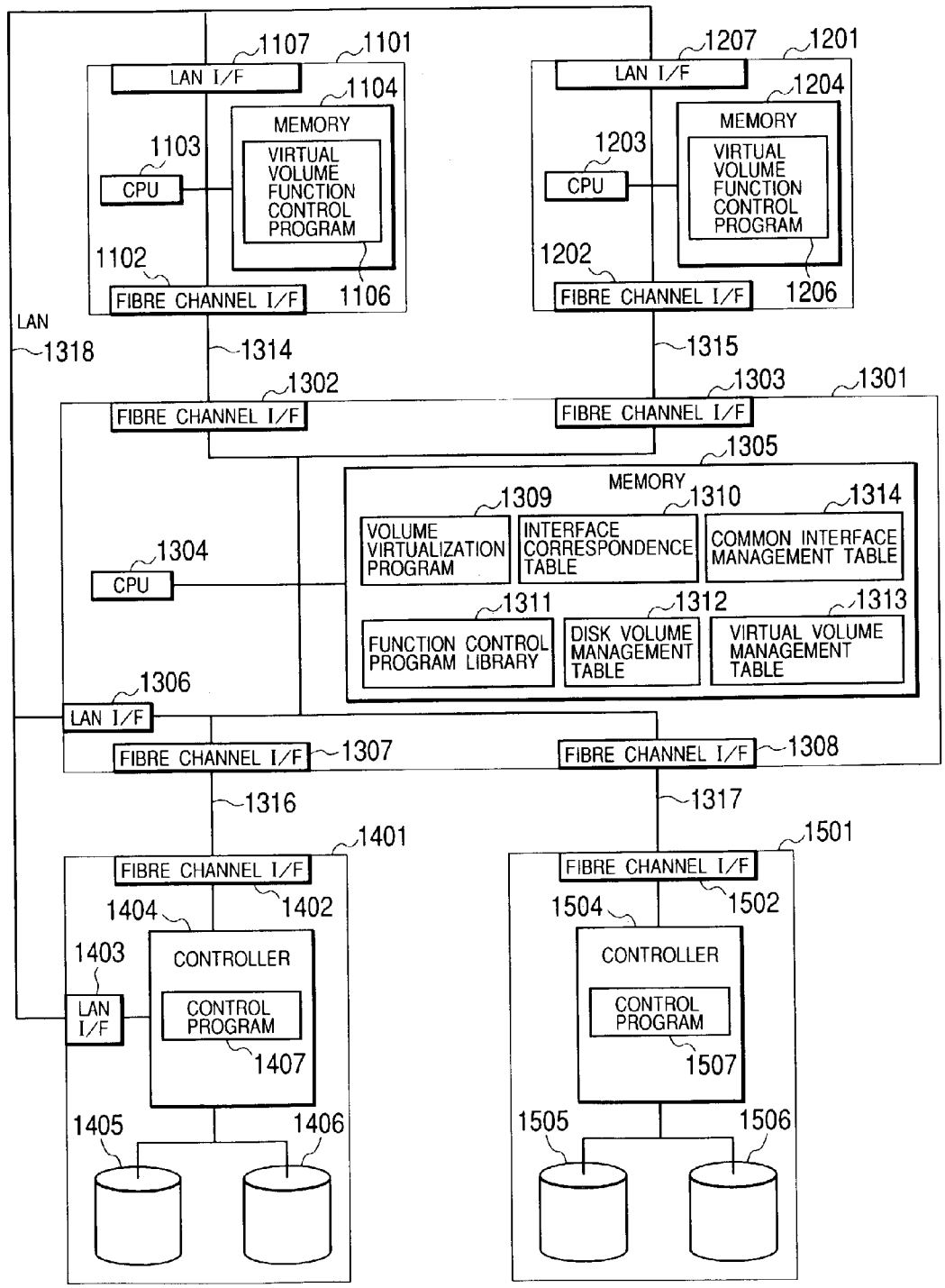
FIG. 1 is an overall block diagram of a first embodiment of the present invention.

FIG. 1 shows the overall configuration of this embodiment.

There are two host computers 1101, 1201 and two disk arrays 1401, 1501, which are connected to Fibre Channel interfaces 1302, 1303, 1307, 1308 of a virtualization server 1301 through Fibre Channel interfaces 1102, 1202, 1402, 1502 and Fibre Channel cables 1314 to 1317 respectively. Data input/output from a host computer to a storage device is realized according to a standard SCSI protocol of these Fibre Channel cables. In the following description, the host computer and the disk array device are connected directly to the virtualization server. Because the present invention does not depend on a communication medium and a connection form, however, it can apply to even the connection via a switch and the configuration using another communication media and protocol such as a SCSI, not on a Fibre Channel network, and an IP network.

A virtual volume function control program 1106 for instructing virtual volume function control is provided in a memory 1104 of the host computer 1101 and executed by a CPU 1103. The virtual volume function program 1106 is installed previously in a host computer that sends a function control instruction of a disk array. The virtual volume function control program 1106, as described later, sends necessary information such as a controlling function and a virtual volume to be controlled to a common interface (virtual volume supplied as a common interface viewed from the host computer) provided by the virtualization server 1301 and instructs function control. The host computer 1201 also has the same configuration.

In the disk array 1401, a control program 1407 of a controller 1404 integrates the overall operation. The control program 1407 provides various intelligent functions such as a mirror function and a snapshot function in addition to an ordinary disk array function that provides disk volumes 1405 and 1406 as the storage area of the host computer. The disk array 1501 has also the same configuration as the disk array 1401 and provides the intelligent function that includes the mirror function.

In the virtualization server 1301, a volume virtualization program 1309 controls the overall operation and provides a storage virtualization function. Because the detailed implementation method of storage area virtualization is not the main purpose of the present invention, it is described briefly. When one virtual volume is created from plural disk volumes which disk arrays provide, the storage area of each disk volume is combined and made to appear like the one virtual volume. The address space of each disk volume is mapped to part of the address space of the virtual volume and a continuous address space is realized. The control program of the virtualization server 1301 manages the interrelationship between a virtual volume and actual disk volumes that compose the virtual volume and the interrelationship between the address space of the virtual volume and the address spaces of the actual disk volumes. The virtual volume is recognized as an LU (logical device) of a SCSI by a host computer, that is, an ordinary disk volume. When the host computer issues the Read or Write command to access the virtual volume, the virtualization server 1301 interprets the disk volume and address of a destination and issues a command to the actual disk volume. If the access destination is an area extending over plural disk volumes, plural commands are issued. Accordingly, one virtual volume that combines plural disk volumes can be realized.

Moreover, the virtualization server 1301 has a virtual volume management table 1313, a disk volume management table 1312, an interface correspondence table 1310, a function control program library 1311, and a common interface management table 1314 to realize a common interface for controlling a disk array function. These details will be described later.

(2) Description of Function Control of Disk Array Device

The function control of a disk array is described quoting a mirror function as an example. The mirror function handles one of two disk volumes as the primary volume and the other of them as the secondary volume and performs the duplication of data, thereby enabling five types of control that are initialization, suspension, re-synchronization, cancellation, and state acquisition.

For example, if the disk volume 1405 of the disk array 1401 is paired with the disk volume 1406 as the primary volume and the secondary volume, first, when mirror initialization is instructed, the contents of the primary volume 1405 are all copied to the secondary volume 1406. When the contents of the primary volume are updated after initialization is completed, the controller 1404 automatically updates even the contents of the corresponding secondary volume 1406. When mirror suspension is instructed, the disk volume 1406 is not updated automatically even if the data of the disk volume 1405 is updated, and the data at the time when mirror suspension is instructed remains in the disk volume

1406. When re-synchronization is instructed, the parts in which a difference occurred between the main and secondary volumes in the course of suspension are copied so that the two volumes can have the same contents. When cancellation is instructed, a pair of the main and secondary volumes is cancelled and the mirror function is nullified so long as initialization is not instructed again. When state acquisition is instructed, the controller 1404 returns the current state such as initialization being processed, being interrupted, or an error condition and so on. The state is returned through a control interface using a predefined data type in the same manner as a control instruction.

Figures 4, 5:
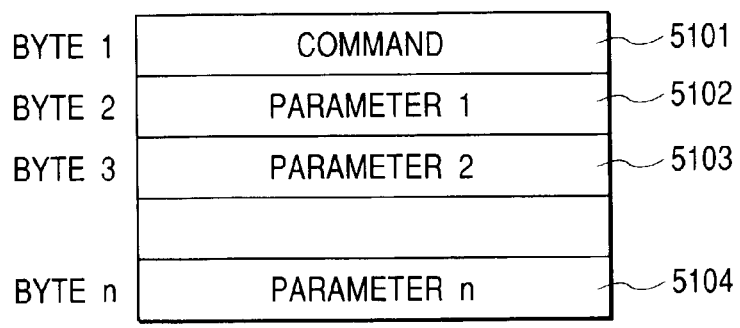
FIG. 4 is a drawing showing the configuration of an interface correspondence table in the first embodiment of the present invention.
FIG. 5 is a drawing showing the configuration of a control block of a disk array in the first embodiment of the present invention.

In the disk array 1401, a LAN interface 1403 is provided as the control interface of each function and externally receives an instruction according to a predetermined protocol. Based on the instruction, the controller 1404 performs function control. For example, the control block shown in FIG. 5 is received in a predetermined port of the LAN interface, the control program 1407 of the controller interprets a command stored in a first byte 5101 and determines the operation contents of the instruction. Parameter fields 5102 to 5104 following the command record a necessary parameter for executing the instruction such as a disk volume to be operated, and the meaning of data is defined previously in the fields for every command. Accordingly, the function of the disk array 1401 can be controlled externally by sending the control block shown in FIG. 5 to the LAN interface 1403.

In the disk array 1501, there is no LAN interface, and a function control instruction is sent as the SCSI Mode Select command to a disk volume to be controlled through the Fibre Channel interface 1502. State acquisition is instructed with the Mode Sense command to the disk volume to be controlled and a state is returned as Sense data.

(3) Description of Common Interface

A common interface which a virtualization server provides can be realized by the same method as a function control interface a disk array provides. In this embodiment, however, an example of implementing the common interface as a virtual volume that is recognized as a disk volume connected through a Fibre Channel interface from a host computer is described.

The host computer recognizes the common interface as a readable/writable storage area in the same manner as other virtual volumes and exchanges control information by issuing the Read and Write commands. The disk volume that becomes an actual storage area is not allocated, however, and only an address space is provided by the volume virtualization program 1309. Function control is instructed by writing a control block having the data structure shown in FIG. 8 from the host computer to, for example, the first 512 bytes of the virtual volume that is the common interface. A command 8101 of FIG. 8 indicates a controlling function such as a mirror function and a snapshot function, and a subcommand 8102 indicates an instruction such as initialization or suspension, for example, in the case of the mirror function. The command and the subcommand are specified using a number by previously defining the number to each function and instruction. Further, virtual volume identifiers 8103 and 8104 are utilized for specifying a virtual volume to which the function applies. For example, in the case of mirror initialization, the virtual volume identifier 8103 specifies the primary volume and the virtual volume identifier 8104 specifies the secondary volume. Any information that uniquely identifies a virtual volume can be utilized to specify a virtual volume to be controlled as well as the identifier. For example, it is possible to specify a virtual volume using a WWN (world wide name) of a fibre virtual interface of a virtualization server allocated to the virtual volume and a LUN (logical device number). Other parameters 8105 and 8106 are used as areas that specify other necessary information.

Figure 8:
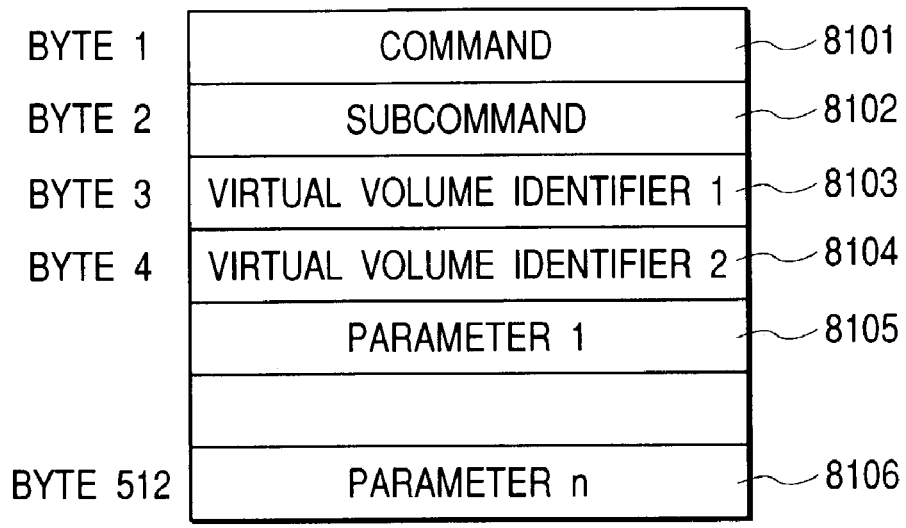
FIG. 8 is a drawing of the control block of a common interface in the first embodiment of the present invention.

The volume virtualization program 1309, when the Write command to the first 512 bytes of a common interface is received, assumes the command to be a function control instruction and interprets the first 512 bytes in accordance with the data structure of FIG. 8. The write operation to areas other than the first 512 bytes causes an error. Further, when information such as a state of the virtual volume is transferred from a virtualization server to a host computer, the Read command is issued from the host computer to the common interface. In that case, the information is returned as data for the Read command. Though not shown in the drawing in particular, the predefined data structure is used in the same manner as a control block written by the Write command.

The administrator sets the WWN and LUN of the Fibre Channel interface allocated to the common interface as a parameter of the virtual volume function control program of the host computer. Otherwise, the virtual volume function control program of the host computer can automatically identify the common interface by issuing the Inquiry command to each LU connected to the Fibre Channel interface and searching the LU that returns a predefined vendor ID and a product ID unique to the common interface.

To realize the common interface, the virtualization server has the virtual volume management table 1313, the disk volume management table 1312, the interface correspondence table 1310, the function control program library 1311, and the common interface management table 1314. The common interface management table 1314 has the configuration shown in FIG. 12 and manages the WWN and the LUN of the Fibre Channel interface allocated to the common interface. The combination of the WWNs (allocated to the Fibre Channel interface) and the LUNs recorded here cannot be used for other virtual volumes. By defining plural common interfaces, it is possible, for example, to allocate an individual common interface for each host computer.

The virtual volume management table 1313 has the configuration shown in FIG. 2 and manages the interrelationship between each virtual volume and actual disk volumes that compose the virtual volume. A unique serial number is assigned to each virtual volume as an identifier (2101). Further, a WWN (world wide name) (2102) of the Fibre Channel port of the virtualization server and a LUN (logical device number) of a virtual volume allocated for allowing a host computer to access the virtual volume are recorded (2103). Furthermore, identifiers (serial number) of actual disk volumes that compose the virtual volume is recorded in 2104 to 2107 of the table. In the example of a virtual volume 1 of FIG. 2, the virtual volume 1 can be accessed from the port which has WWN of wwn3 with LUN of lun1 and has two disk volumes having identifiers 1 and 3. Vol. 1 indicates the first disk volume and Vol. 2 indicates the second disk volume. An item of control processing (2108) is a flag indicating whether the virtual volume is processing any function control. If any function control is being processed, "being processed" is recorded.

A disk volume is managed using the disk volume management table 1312 having the configuration shown in FIG. 3 unlike a virtual volume. Each disk volume has a unique serial number as an identifier (3103), a WWN (3102) of a Fibre Channel port of a disk array device allocated to the disk volume, a LUN (3103) and a capacity (3104) of the disk volume are recorded. Further, a device type (3105) of the disk array device that provides the disk volume and an identifier are recorded (3106). Device type information is the information unique to a device type such as a vendor ID and a product ID returned to the Inquiry command. Generally, devices whose device types differ have different protocol. The device identifier is a unique serial number allocated for every disk array device. APIs used to control various functions applied to each volume and function control interfaces which a disk array device provides are recorded in 3107 to 3112. The interfaces 3108, 3111, 3112 record an IP address and a port number, for example, when the interface is LAN port of the disk array which receives a control packet and record the WWN and LUN allocated to the disk volume when the interface is a disk volume to be controlled which receives Mode Select and Mode Sense as instruction.

Figure 9:
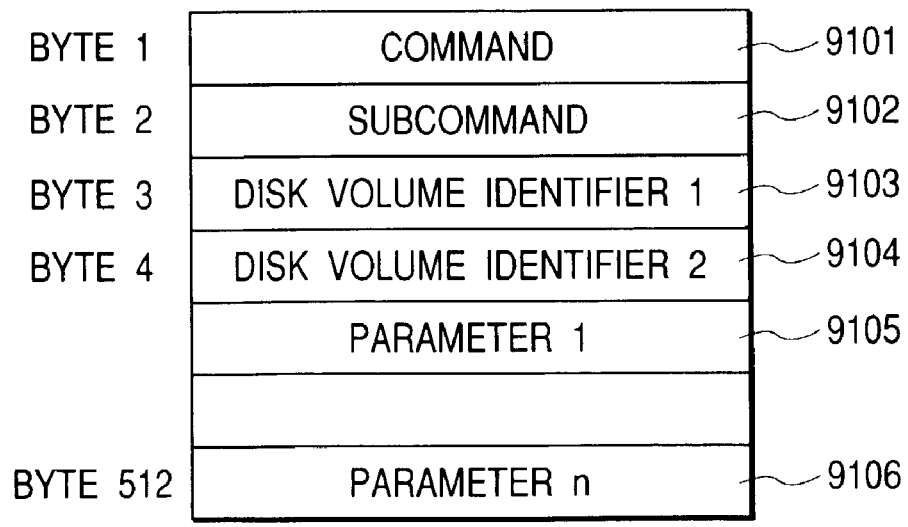
FIG. 9 is a drawing of argument data of a control API in the first embodiment of the present invention.

Each API is provided by the function control program library 1311, and, for example, implemented as the function that is linked dynamically to the control program 1309 using the structure of FIG. 9 as an argument. A function is read from the function control library 1311. The function is represented as the API (application programming interface). In order to control intended function, each API sends an instruction to a disk array according to a protocol unique to a disk array device which provides a disk volume to be controlled. Because the structure of data sent as a control instruction is defined for each device, each API includes logic which converts the data structure defined for the common interface shown in FIG. 9 to a device unique parameter shown in FIG. 5. Further, though not shown in the drawing in particular, even when a return value of an API call is necessary, the value is returned in the common data structure in the same manner as a call argument.

When a virtualization server recognizes a new disk volume, the administrator of the virtualization server creates each entry of the disk volume management table of FIG. 3. A volume virtualization program can also register several items in a volume management table automatically without the operation of the administrator, however. For example, it is possible to detect the WWNs and LUNs by scanning LUs connected to Fibre Channel interfaces, and identify capacity of each volume by issuing the SCSI Read Capacity command. Device type information can be recorded by issuing the SCSI Inquiry command to a disk volume and acquiring a vendor ID and a product ID. Further, by previously installing the interrelationship between the device type information and the API to be used as the interface correspondence table 1310 shown in FIG. 4, a necessary API can be recorded in a disk volume management table in accordance with a device identifier.

(4) Mirror Initialization Using Common Interface

An example of controlling the function of a disk array device using a common interface is described quoting the mirror initialization of a virtual volume.

Figure 6:
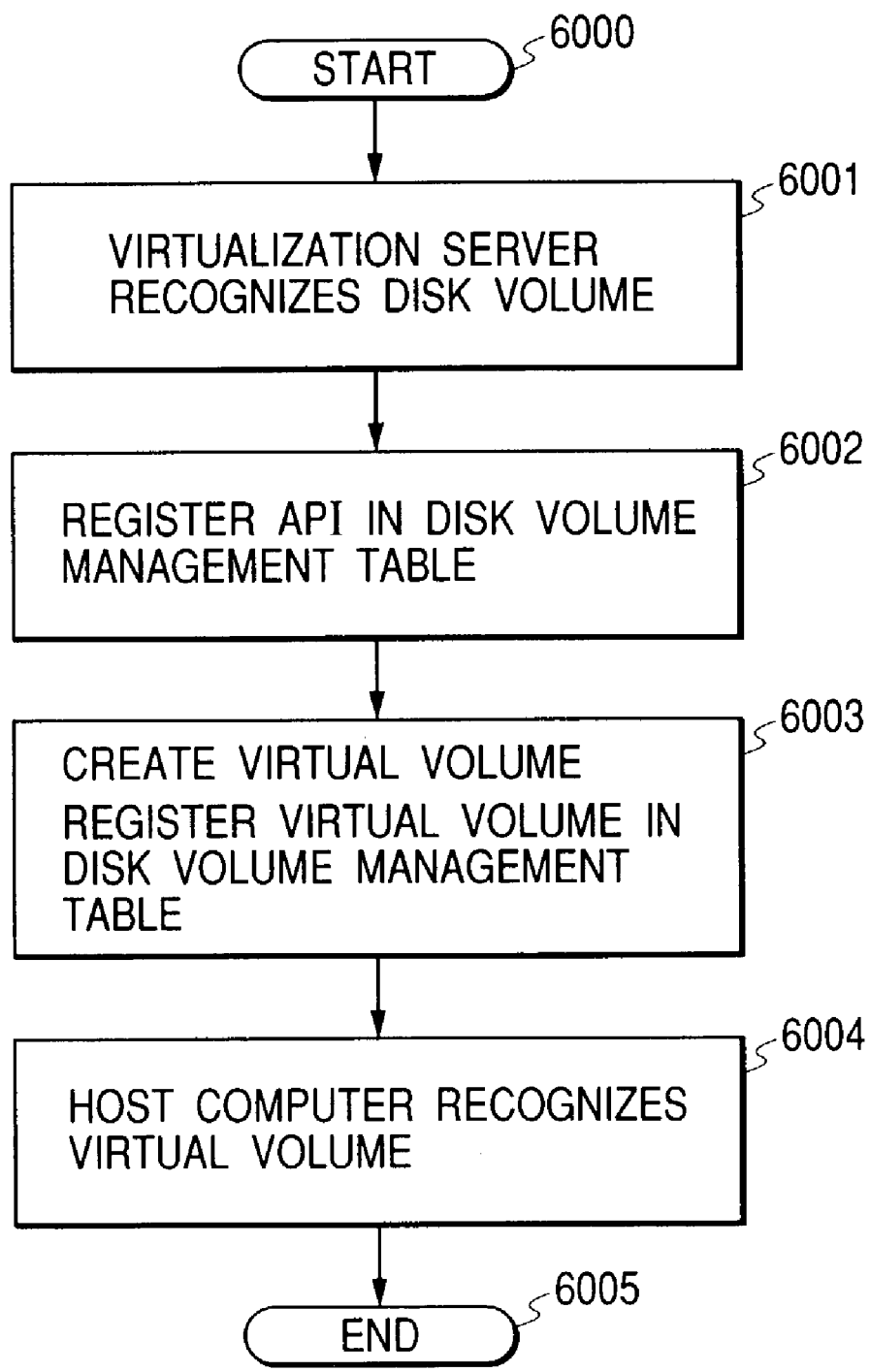
FIG. 6 is a flowchart of virtual volume creation in the first embodiment of the present invention.

As a preparation for describing, the function control using the common interface, the virtual volume creation procedure in this embodiment is described using the flowchart of FIG. 6 that forms part of the volume virtualization program 1309. When a new disk volume is connected to a virtualization server, first, the volume virtualization program recognizes the new disk volume as a device connected to a Fibre Channel interface (step 6001). Subsequently, as described above, the administrator or the volume virtualization program registers a WWN, LUN, device identifier, and function control API of the disk volume (6002) in a disk volume management table. When a virtual volume is created from the registered disk volume, the WWN, LUN, and disk volume used are registered in a virtual volume management table (step 6003). Finally, a virtual volume can be used as a storage area of a host computer by recognizing the virtual volume from the host computer.

Figure 7:
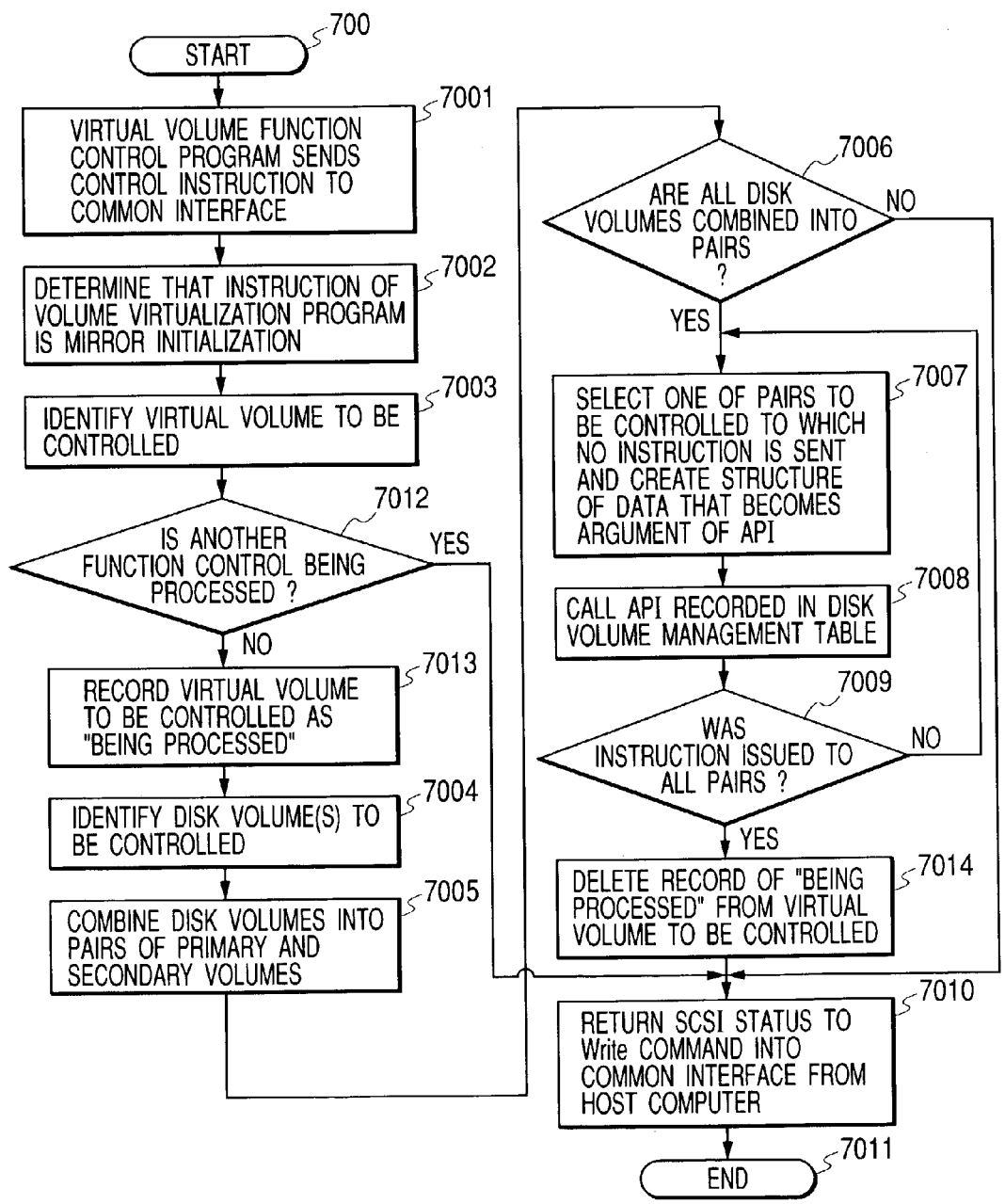
FIG. 7 is a flowchart of mirror pair initialization in the first embodiment of the present invention.

In FIG. 1, according to the above procedure, when the virtual volume 1 is provided to the host computer 1101 and the virtual volume 2 is provided to the host computer 1201, an example of initializing a mirror that uses the virtual volumes 1 and 2 as a pair is described using the flowchart of FIG. 7 that forms part of the volume virtualization program in the same manner.

First, in step 7001, the Write command is issued from a host computer to a common interface and the control block of FIG. 8 is written to first 512 bytes. A mirror function is specified for a command 8101 of the control block and initialization is specified for a subcommand 8102. Identifiers of the virtual volumes 1 and 2 are specified for virtual volume identifiers 1, 2 (8103, 8104). When this control block is received by the LU of the Fibre Channel port recorded in the common interface management table of FIG. 12, the volume virtualization program of a virtualization server determines that the instruction is the initialization of the mirror function (step 7002) and executes a processing routine for the mirror initialization of the volume virtualization program. The Write command of the control block including an undefined command causes an error. The processing routine for mirror initialization identifies virtual volumes to be controlled with reference to the virtual volume identifiers 8103 and 8104 of the control block (step 7003).

Hereupon, whether the virtual volume to be controlled is processing other function control is checked with reference to a virtual volume management table (step 7012). If other function control is already being processed, process goes to step 7010. If other function control is not being processed, "being processed" is recorded in the control processing item of the virtual volume management table (step 7013). Further, a disk volume that constitutes each virtual volume is identified with reference to the virtual volume management table (step 7004). The example of the virtual volume management table of FIG. 2 shows that the virtual volume 1 is provided with disk volumes 1 and 3 and the virtual volume 2 is provided with disk volumes 2 and 4.

Subsequently, in step 7005, disk volumes are combined mirror pairs. To combine the disk volumes into the mirror pairs, the primary volume and the secondary volume must exist in the same disk array device and volume capacities must be equal. Each volume capacity and the disk array device which provides the volume can be confirmed by referring the capacity and device identifier of a disk volume management table. Disk volumes which satisfy each of the above conditions are combined into mirror pairs which consist of a disk volume that becomes the primary volume and a disk volume that becomes the secondary volume. If there is a pair of which capacity does not match or a pair that does not exist in the same device, process terminates with a mirror initialization failure (step 7006). If there are plural combinations of pairs that satisfy the conditions, for example, the virtual volumes that become the primary volume and the secondary volume have the disk volumes 1, 3 and 2, 4 respectively, and a pair can be combined with the disk volumes 1, 2 and 3, 4 as a pair. On the other hand, the case where the pair can be formed with the disk volumes 1, 4 and 3, 2 is also possible. In such a case, the smallest disk volume identifiers are combined. In the case of the aforementioned example, the disk volume that becomes the primary volume is 1, 3 in the ascending order of an identifier and the disk volume that becomes the secondary volume is 2, 4 in the same manner. Accordingly, 1 and 2, and 3 and 4 are paired in the ascending order of the identifier. Consequently, even when the pair relationship of disk volumes must be known for another function instruction, disk volume pairs which are identical to what are made in an initialization process are always obtained for a virtual volume.

After it is confirmed that a mirror can be formed, mirror initialization instructions are sent to disk array devices for all pairs. The control data that becomes an argument which has the structure of FIG. 9 when a control API is called is created for each pair (step 7007). An API and an interface used to send a control instruction to each disk volume are obtained from a disk volume management table and the API is called using the interface and aforementioned control data as arguments (step 7008). For example, regarding the pair of the disk volumes 1, 2, an instruction of the initialization is sent through the API of func1 and the registered IP address and port number as a control interface with reference to the disk volume management table. This is repeated for all pairs (step 7009). After the instructions are sent to all the pairs, the record of "being processed" of a virtual volume management table is deleted (step 7014). Finally, a host computer is informed that the control instruction was completed. This is implemented by returning a status of Write command sent to a common interface (step 7010).

A mirror initialization instruction is issued in this manner which includes converting a control block received from a host computer through a common interface in step 7002 to a protocol unique to a disk volume in steps 7007 and 7008. According to the aforementioned procedure, the mirror function of a virtual volume that has plural disk volumes can be controlled from the common interface regardless of the type of a disk array device.

(5) Mirror State Acquisition Using Common Interface

Even when a mirror state of a virtual volume is acquired, an instruction is sent from a host computer to a common interface in the similar procedure to the aforementioned mirror initialization. A virtualization server calls an API for acquiring the mirror state from a disk array device. In the case of state acquisition, however, the difference is that the virtualization server must convert the mirror states of the disk volumes acquired from disk array devices to a mirror state of a virtual volume and transfer it to the host computer.

Figure 10:
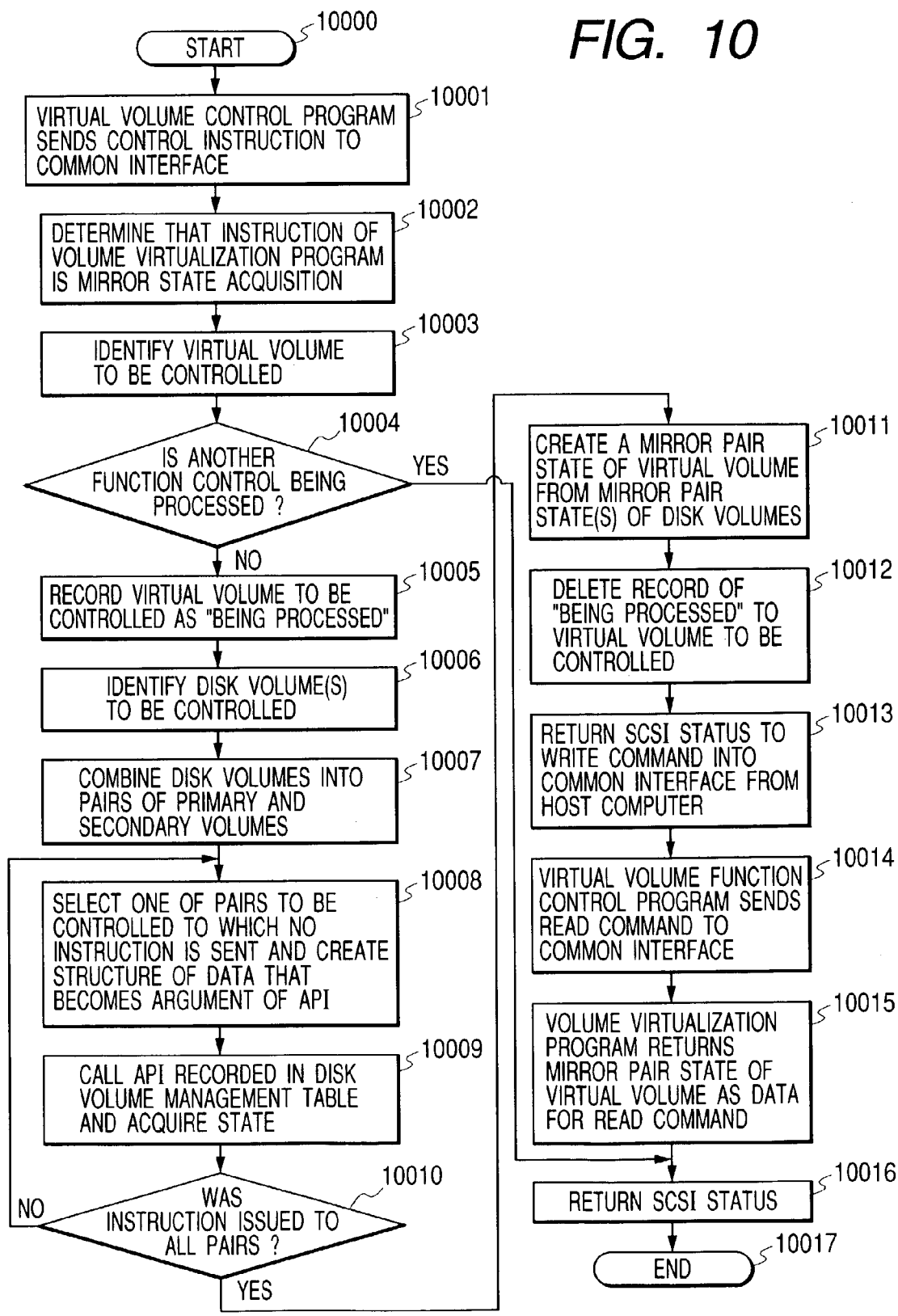
FIG. 10 is a flowchart of virtual volume information acquisition in the first embodiment of the present invention.

The mirror state acquisition procedure is described using the flowchart of FIG. 10. FIG. 10 also shows part of the volume virtualization program 1309. Steps 10001 to 10006 are the same as the steps 7001 to 7005 of FIG. 7. In steps 10008 to 10010, mirror pair states of disk volumes are acquired. Subsequently, mirror pair states of virtual volumes are created from these states (step 10011). For example, if the mirror pair states of the disk volumes are six states of "nullification" before initialization, "initialization" in which the initialization is being processed, "synchronization" in which the initialization is completed and the main and secondary volumes have the same data, "suspension" in which a mirror is suspended, "re-synchronization" in which the process that returns to a synchronized state from again the suspension is being performed, and an "error" in which a failure occurs, the mirror pair states of the virtual volumes can be created as shown in FIG. 11. If the mirror pair states of all disk volumes are identical, a mirror pair state of virtual volumes is the same state. If there is a state that does not match, the mirror pair state of the disk volumes is not consistent. Accordingly, the mirror pair state of the virtual volumes is "error". In initialization process and re-synchronization process, however, because all mirror pairs of disk volumes do not always complete operation at the same time, there is a possibility of the mirror pair state in which the operation completed early enters the "synchronization" In that case, even if there is a mismatch, the mirror pair state of the virtual volume does not cause the error but enters the "initialization" and "re-synchronization" respectively.

After a mirror pair state of a virtual volume is created, the record of "being processed" of a virtual volume management table is deleted (step 10012) and a status is returned to a host computer (step 10013). This status is defined in a standard as part of the SCSI protocol. Usually, if there is no error, Good (byte code=00000) is returned. Accordingly, the virtual volume function control program of the host computer recognizes the completion of state acquisition operation and sends the Read command to a common interface to read a state. The volume virtualization program of a virtualization server returns the mirror pair state of the virtual volume created in the step 10011 as the data for the Read command (step 10015) and finally returns a status (status 10016).

As described above, FIG. 11 shows the correspondence table between the mirror state of virtual volumes and the mirror states of actual disk volumes that compose the virtual volume. The mirror states of the actual disk volumes acquired in the steps 10008 to 10010 of FIG. 10 are compared with FIG. 11 and the mirror state of the virtual volumes is created (step 10011). The conversion according to the correspondence table of FIG. 11 corresponds to the conversion of a protocol.

According to the aforementioned procedure, function control in which information must be transferred from a virtualization server to a host computer can also be realized.

This embodiment, in storage virtualization environment in which plural disk array devices having a different function control interface exist, can apply a storage function such as a mirror function, to virtual volumes. At that time, instruction of function control can be made by a common method without being sensitive to which device a constituting storage area exists in.

In this embodiment, the basic function of storage virtualization and the common interface of the function control are provided by the same virtualization server, but each function can also be realized in an individual device. Further, this embodiment can also apply to a switch device having the same storage virtualization function as well as the server. Here, these devices are called connecting devices of storage devices. Furthermore, this embodiment can also apply to the function control in a unit of a file system, for example, by replacing a disk array with a file server, a Fibre Channel and the SCSI protocol with a LAN and the NFS protocol, a management unit of a virtualization server with a file system, and a common interface with a LAN interface.

Second Embodiment

The configuration of this embodiment is almost the same as the first embodiment of FIG. 1, but a virtualization server provides plural common interfaces. Further, when the virtualization server instructs a function to control a disk array device, if an instruction to some disk volumes was unsuccessful, a means for executing error handling is provided. Only the points that differ from the first embodiment are described.

(1) Plural Function Control Interfaces

In this embodiment, a virtualization server provides a host computer with two common interfaces. In addition to an interface by a virtual volume described in the first embodiment, an interface through a LAN using the LAN interface 1306 of FIG. 1 is provided. The common interface management table 1314 also has the table of the configuration of FIG. 13 in addition to the table of the configuration of FIG. 12. Input data whose destination is the combination of a LAN interface (IP address) and a port number recorded in the table of FIG. 13 is interpreted as a function control block. When a common interface is implemented with the LAN interface, it sends and receives data through Ethernet (registered mark of Xerox Corporation) as it sends and receives the SCSI command and data through a Fibre Channel in the first embodiment. A confirmation packet (acknowledge) is returned to indicate the completion of processing instead of the SCSI status. A function control instruction using the LAN interface is enabled by utilizing this second common interface, for example, in a host computer of which the input/output to a Fibre Channel interface is disabled without passing through a file system. That is, in the host computer in which the input/output of the Fibre Channel interface is enabled only via the file system, all input/output is file operation, and the user cannot specify the input/output address and the data structure of a packet or send a control packet to a common interface. Such a host computer can send the control packet to the common interface by utilizing the LAN interface.

The virtual volume function control program 1206 of the host computer 1201 of FIG. 1 has a LAN communication function as well as a function of accessing the common interface implemented with the LAN interface instead of the common interface of the first embodiment provided as a virtual volume. The administrator sets an IP address and a port number of a common interface for the virtual volume function control program in the same manner as the WWN and LUN of the common interface in the first embodiment.

The disk array 1401 provides a function control method by the Mode Select/Mode Sense command via a Fibre Channel interface in the same manner as the disk array 1501 in addition to the function control through the LAN interface described in the first embodiment. That is, the volume virtualization program of a virtualization server can send a function control instruction to the disk array 1401 both via the LAN and via the Fibre Channel.

The volume management table of a virtualization server is modified to correspond to plural control interfaces of the disk array 1401. Further, an item is added to define recovery processes for errors that occur while a function control is processed. The modified disk volume management table is shown in FIG. 14. In FIG. 14, items 14101 to 14106 correspond to the items from the volume identifier 3101 to the device identifier 3106 of FIG. 3. Because the items are not modified, their description is omitted. 14107 is an API called to instruct the function control. For the disk volume of a device having plural control interfaces such as the disk array 1401, plural APIs that correspond to each interface are registered. In the example of FIG. 14, the disk volume 1 is provided by the disk array represented by device identifier A which has two control interfaces, and func1 and func5 are registered as the API for mirror initialization for two interfaces respectively. On the other hand, because the disk array represented by device identifier B has only one control interface, only one API (func5) is registered. Further, a control interface used by each API is recorded in an I/F 14108.

A recovery API 14109 is called when error handling is performed. For example, the virtualization server is instructed a function control for a virtual volume having two disk volumes. In this case, when the control for one disk volume is successful and the control for the other disk volume is unsuccessful, this API is used to cancel the successful instruction, in order to return the state of the virtual volume to the state before the instruction is issued. A Recovery API is called with the same argument as the API and registered in the same method as the API.

(2) Error Handling

The function control instruction procedure in this embodiment is almost the same as the first embodiment, but the points that differ are that error handling is performed using plural control interfaces which a disk array provides and the Recovery API previously registered in a volume management table. Only the modification part from the first embodiment is described regarding the mirror initialization instruction procedure. The API of mirror cancellation is assumed to have been registered previously in the Recovery API of the mirror initialization of the volume management table.

Figure 15:
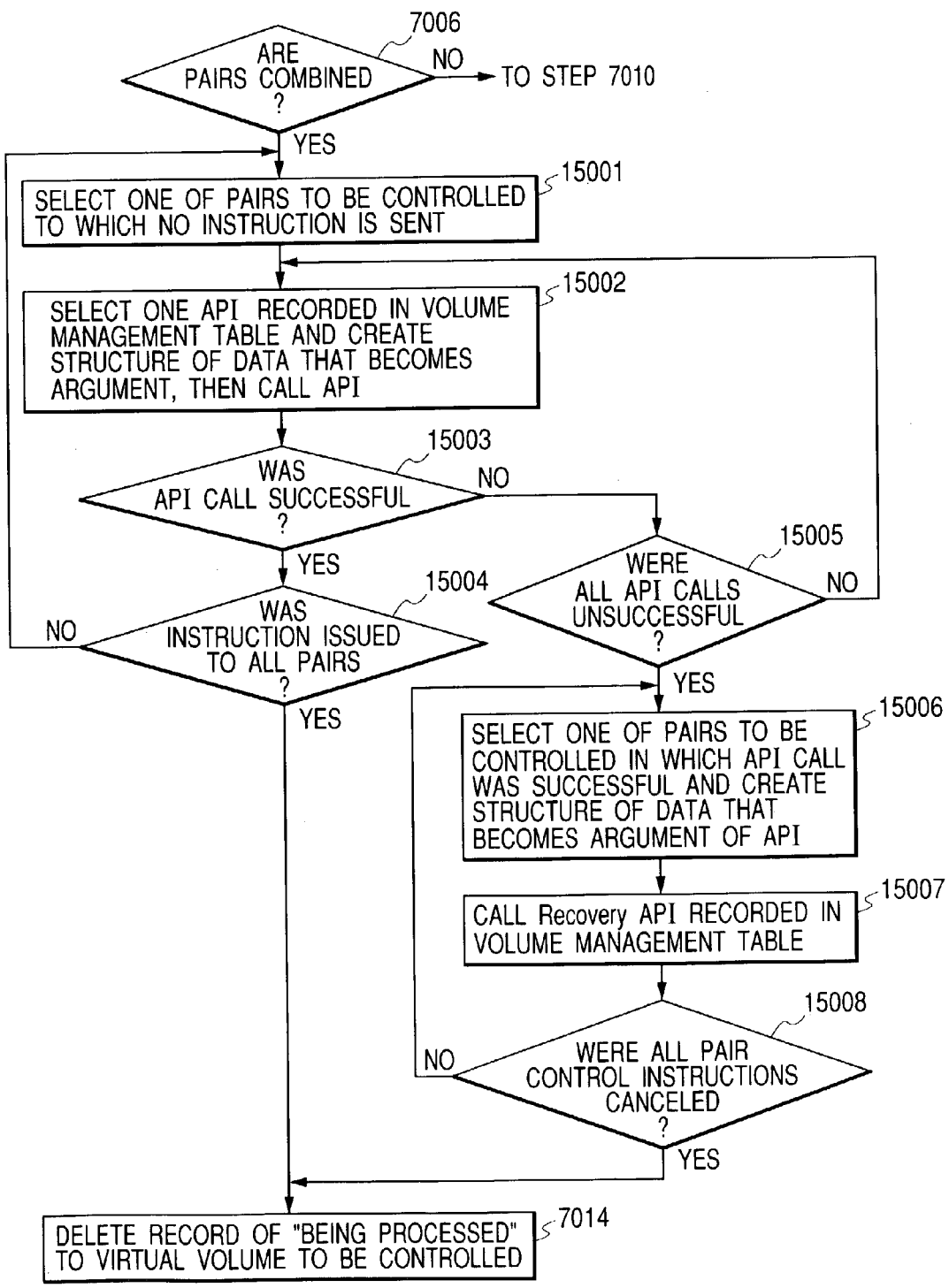
FIG. 15 is a flowchart of the mirror pair initialization in the second embodiment of the present invention.

FIG. 15 shows the modification part between the steps 7006 and 7014 of the mirror initialization process of FIG. 7. In step 15001, one of the mirror pairs of disk volumes to which a control instruction is sent is selected and one API used for the mirror initialization instruction of the disk volumes is selected from the volume management table (step 15002). If the API is called (step 15002) and the call is successful, the same process is repeated for all mirror pairs of disk volumes (steps 15003, 15004). If a control instruction cannot be sent to a disk array due to the disconnection of a LAN or a Fibre Channel cable and an API call is unsuccessful, another API is selected from the volume management table and the API call is retried (step 15005). Because there may be several APIs for one disk volume, this determines if there is an API that is not retried yet. A failure can be recognized as the timeout or receipt of an error status from the disk array. If calls of all APIs registered in the volume management table are unsuccessful, a Recovery API is called for the mirror pairs of the disk volumes for which the API call was successful and mirrors are canceled (step 15006, 15007). This Recovery API call is repeated for all mirror pairs of disk volumes (step 15008). If all API calls are successful or error handling is all completed, process proceeds to the step 7014 and subsequent steps.

In this embodiment, plural common interfaces provided by a virtualization server allow host computers select communication means. Accordingly, even when each host computer has different communication means to send a control instruction, the same effect as the first embodiment is obtained. Further, when a function for a virtual volume having plural disk volumes is controlled, plural control instructions are sent to a disk array. When some instructions fail instructions completed successfully are cancelled and the virtual volume can be returned to a consistent state. In this embodiment, a single Recovery API was defined for each API, but the Recovery APIs used for various error condition can also be defined. In other words, in a third embodiment, as shown in FIG. 14, one Recovery API is defined as an API that cancels processing of an API. However, such implementation that defines plural Recovery APIs for the single API is also possible. For example, it is possible to use different Recovery API5 in an error condition caused by a channel failure and an error condition caused by a controller failure of a storage device respectively. Plural Recovery APIs can be used properly in this manner according to the type of the error. Further, in this embodiment, a Recovery API is not used for a control object for which an API call was unsuccessful, but, it is possible to define, the Recovery APIs used when the API call is unsuccessful, as need arises.

Third Embodiment

This embodiment is an example of applying the present invention to SAN environment in which a Fibre Channel network is used and utilizing a common interface for the function control of disk volumes. The common interface is provided by a Fibre Channel switch instead of a virtualization server. Further, a security function that records a function control log at a management console and restricts the control that can be sent from a host computer is provided. In this embodiment, instructions of function control are the Mode Select and Mode Sense commands sent to a disk volume to be controlled and the common interface is also the volume.

(1) System Configuration

Figure 16:
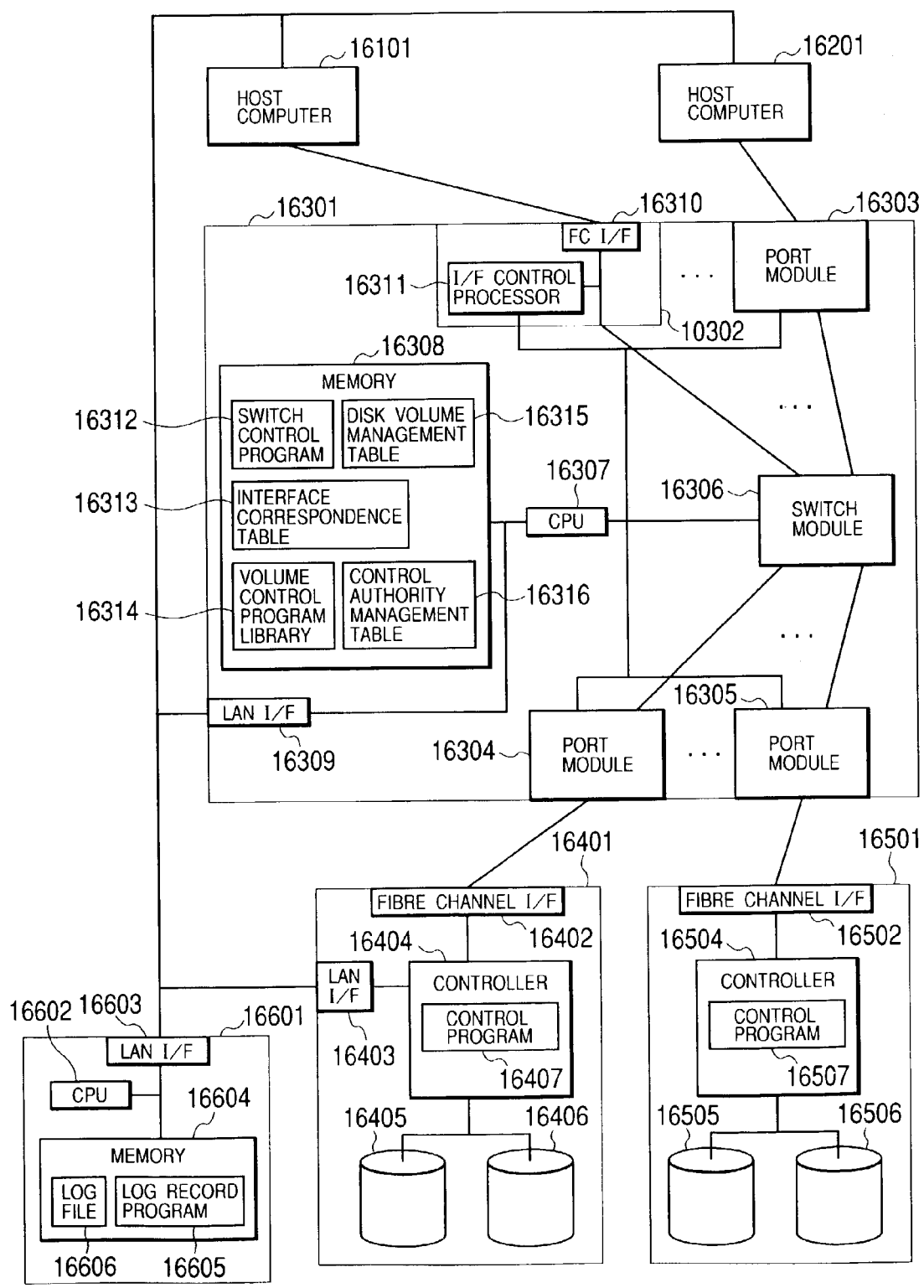
FIG. 16 is the overall block diagram in a third embodiment of the present invention.

FIG. 16 shows the overall configuration of this embodiment.

The configuration and operation of host computers 16101, 16201 and disk arrays 16401, 16501 are the same as the first embodiment, and their devices are connected to a Fibre Channel switch 16301. The virtual volume function control program of the host computer sends the Mode Select and Mode Sense commands instead of the Read and Write commands unlike the first embodiment. Each page code uses a vendor unique number defined previously for function control. Data structure of FIG. 17 is used as a parameter list. Because the Mode Select and Mode Sense commands are sent to the disk volume to be controlled, object to be controlled need not be specified in the parameter list. In the control for which two volumes must be specified, such as mirror pair initialization, the second volume is specified in the parameter list. Such a volume is specified by for example the WWN and LUN of the port of a disk array allocated to the volume in part of the parameter list.

Regarding the Fibre Channel switch 16301, the points that differ from a usual Fibre Channel switch is described. A port module 16302 that provides a Fibre Channel port connected to a host computer or a disk array consist of with a Fibre Channel interface 16310 and an interface control processor 16311. When the interface control processor 16311 receives a control instruction for a common interface, the instruction is transmitted to a CPU 16307. Specifically, if a CDB (command descriptor block) of the SCSI command received by a Fibre Channel interface is interpreted and the received command is the Mode Select or Mode Sense command having a page code defined for function control, it is determined that the command is sent to access to the common interface, and the WWN of a host computer which is a source of the command, the WWN and LUN of a destination volume, and the contents of a command are posted to the CPU 16307.

The CPU 16307 executes a switch control program 16312 in a memory 16308 and controls the switch operation. An interface correspondence table 16313, a volume control program library 16314, and a volume management table 16315 have the same configuration of the first embodiment. The switch control program 16312 converts a protocol using these tables. Because the details are the same as the first and second embodiments, they are omitted. Because this embodiment does not have a storage virtualization function, a virtual volume management table is not provided. Further, because a disk volume itself to be controlled becomes a destination of a control command from a host computer, that is, a common interface, this embodiment does not have a common interface management table.

A control authority management table 16316 is constructed as shown in FIG. 18. For each function control of each disk volume, host computers permitted to that can instruct the control the function are specified with WWNs of their Fibre Channel interfaces. In the example of FIG. 18, the host computers having the WWN of wwn1 and wwn2 can order the mirror initialization and suspension control for the disk volume 1. Further, it is indicated that only the host computer of wwn2 can order the acquisition of a snapshot. The administrator registers and modifies these pieces of information.

When the switch control program 16312 receives a control instruction through a common interface, a record of control is transmitted from a LAN interface 16309 to a management console 16601 specified with an IP address and port number which are set previously by the administrator. The contents of the record include time of a control source instruction, whether the control is permitted or not object to be controlled, contents of control, an interface used to send an instruction to a disk array, and information that identifies the success or failure of control.

In the management console 16601, a log record program 16605 which logs a control record is executed by a CPU 16602. The log record program waits for the arrival of a control record from a Fibre Channel switch at a LAN interface 16603 and records the result in a log file 16606. Further, the log record program has a function that displays a log so that the administrator can browse recorded information.

(2) Restriction on Sending Control Instruction to Common Interface and Recording of Log In this embodiment, the operation of a switch control program 16312 that sends the Mode Select command for the function control of a disk volume is described using the flowchart of FIG. 19.

First, the virtual volume control program of a host computer sends the Mode Select command to a disk volume to be controlled (step 19001). The control block shown in FIG. 17 is sent as the parameter list and a previously allocated code for function control is used as the Mode Select page code. Usually, a port module of a Fibre Channel switch forwards a command to another port module through a switch module. When it is detected that the command is Mode Select having the page code for the function control, the contents of the command, the WWN of the sending source, and the WWN and LUN of the destination are transmitted to a CPU (step 19002). The CPU of the switch, in step 19003, examines whether the function control is permitted for the source of the instruction. First, an identifier of a volume to be controlled is obtained from the WWN and LUN of the destination volume with reference to a disk volume management table. Subsequently, it is examined whether the function control for the volume specified in the control block is permitted to the WWN of the sending source, with reference to a control authority management table.

If the source WWN of an instruction is not recorded in the list of WWN that have permission, the control is not permitted. Accordingly, a record indicating that an instruction is rejected is sent to the log record program of a management console from a LAN interface (step 19004) and processing proceeds to step 19010. On the other hand, if the control is permitted, instruction of function control is sent to a disk array using the API and control interface registered in the disk volume management table in the same manner as the first embodiment (step 19006). The success or failure of an API call that is the function control of a disk array is examined (step 19007) and the success or failure of the API call is recorded in a log in steps 19008, 19009 respectively.

Finally, the SCSI status is returned to the source host computer of an instruction (step 19010) and operation finishes.

According to this embodiment, in usual SAN environment in which storage virtualization is not used, the function control of disk volumes using a common interface is enabled. Further, it is possible to manage authority of function control by specifying host computers that have permission for each function of each disk volume. Furthermore, a history of control can be recorded in a log. This embodiment manages the control authority in a unit of a host computer, but other management units can be applied as well. For example, authority can be managed in a unit of a user by managing control permission for user in a control authority management table and including a user ID in the control instruction from the host computer. Further, in this embodiment, log information is sent immediately to an external management console, but it can also be logged in the internal storage area of a switch and sent to the management console or acquired from the management console periodically.

As described above, according to the embodiments of the present invention, an interface unique to each device is concealed. A host computer can control a function using a common interface without being sensitive to the type of the device to be controlled. Accordingly, the configuration of a program that issues a control instruction is simplified.

By providing plural common interfaces a communication means a host computer can select. Accordingly, the present invention can even apply to environments in which devices having different communication means that can be used for sending a control instruction are intermixed. Further, when a series of types of function control for plural disk volumes are ordered, the function control of error handling can be defined for the event in which the part of control fails.

Moreover, permission of function control to computers can be managed for each type of function control for each object to be controlled. Further, a control history can be recorded in a log.

What is claimed is:

1. A connecting device connected to one or more host computers and one or more external storage devices through a network, comprising:
    first means for receiving an instruction that controls a function regarding said external storage device from said host computer;
    second means for identifying an external storage device to be controlled from a received instruction;
    third means for selecting contents of instruction to the external storage device from the received instruction;
    fourth means for selecting a method to send an instruction to the external storage device in accordance with an identified object to which the function is applied and selected instruction contents; and
    fifth means for sending the instruction to the external storage device according to a selected method.

2. The connecting device according to claim 1, further comprising:
    sixth means for storing an interrelationship between a storage area recognized by the host computer and a storage area provided by the external storage device that is referred to from said second means; and
    seventh means for identifying one or more storage areas provided by the external storage device, which correspond to the object specified by the host computer, from the instruction received in accordance with said third means.

3. The connecting device according to claim 1, further comprising:
    eighth means for acquiring state information from the external storage device;
    ninth means for creating a state of the object specified by the host computer from plural pieces of state information acquired from the external storage device; and
    tenth means for sending said state information to said host computer.

4. The connecting device according to claim 1, further comprising:
    a plurality of said first means having mutually different protocols.

5. The connecting device according to claim 1, further comprising:
    eleventh means for storing plural methods to send an instruction to the external storage device in accordance with the object to which the function is applied and contents of the control specified by the host computer;
    twelfth means for identifying a failure of the instruction to the external storage device; and
    thirteenth means for selecting other means for sending an instruction when the instruction to the external storage device fails.

6. The connecting device according to claim 5, further comprising:
    fourteenth means for, when an instruction to the external storage device fails storing contents of error handling that correspond to the instruction;
    fifteenth means for identifying objects to which the error handling is necessary when the instruction to the external storage device fails; and
    sixteenth means for executing the error handling for the objects to which it was identified that the error handling was necessary.

7. The connecting device according to claim 1, further comprising:
    seventeenth means for recording entities that have permission of a function control for each object to which the function is applied;
    eighteenth means for determining whether control is permitted, based on information about a sending source of a communication protocol, of the received instruction; and
    nineteenth means for determining whether the received instruction is permitted control.

8. The connecting device according to claim 7, further comprising:
    twentieth means for determining whether control is permitted, based on an identifier of a sending source contained in the contents of the received instruction.

9. A network switch connected to one or more host computers and one or more external storage devices, comprising:
    means for receiving an instruction that controls a function regarding an external storage device from a host computer;
    means for identifying the external storage device to be controlled, from a received instruction;
    means for selecting contents that are instructed to the external storage device, from the received instruction;
    means for selecting a method to send an instruction to the external storage device in accordance with an identified object to which the function is applied and selected instruction contents; and
    means for sending the instruction to the external storage device, by a selected method.

10. A method for controlling a function of a storage device from a host computer through a network switch coupled to one or more host computers and one or more external storage devices through a network, comprising:

receiving an instruction that controls a function regarding said one or more external storage devices from said host computer;

identifying an external storage device of said one or more external storage devices to be controlled from the received instruction;

selecting contents of instruction to the identified external storage device from the received instruction;

selecting a method to send the instruction to the identified external storage device in accordance with an identified object to which the function is applied and selected instruction contents; and sending the instruction to the identified external storage device according to the selected method.

11. The method according to claim 10, further comprising:

providing virtual storage areas for the host computer;

having storage areas in the external storage device;

storing an interrelationship between the virtual storage area and the storage area; and identifying one or more storage areas which correspond to the virtual area specified by the received instruction.

12. The method according to claim 10, further comprising:

acquiring state information related to the identified storage areas from the identified external storage device;

creating a state of the virtual storage area from plural pieces of state information acquired from the identified external storage device; and sending said state information to said host computer.

13. The method according to claim 10, wherein said one or more external storage devices have mutually different protocols for said receiving said instruction that controls said function regarding said one or more external storage devices from said host computer.

14. The method according to claim 10, further comprising:

storing plural methods to send an instruction to the identified external storage device in accordance with the object to which the function is applied and contents of the control specified by the host computer;

identifying a failure of the instruction to the identified external storage device; and selecting other operation for sending an instruction when the instruction to the identified external storage device fails.

15. The method according to claim 10, further comprising:

recording entities that have permission of a function control for each object to which the function is applied;

determining whether control is permitted, based on information about a sending source of a communication protocol, of the received instruction; and determining whether the received instruction is permitted control.

16. The method according to claim 14, further comprising:

storing contents of error handling that correspond to the instruction when an instruction to the external storage device fails;

identifying objects to which the error handling is necessary when the instruction to the external storage device fails; and executing the error handling for the objects to which it was identified that the error handling was necessary.

17. The method according to claim 15, further comprising:

determining whether control is permitted, based on an identifier of a sending source contained in the contents, of the received instruction.

* * * * *